Jan. 24, 1939.  H. A. DOUGLAS  2,145,160
CONTROL APPARATUS
Filed Jan. 12, 1935  2 Sheets-Sheet 2
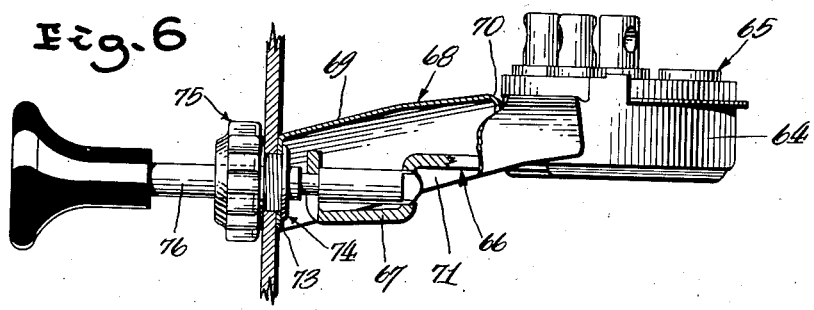
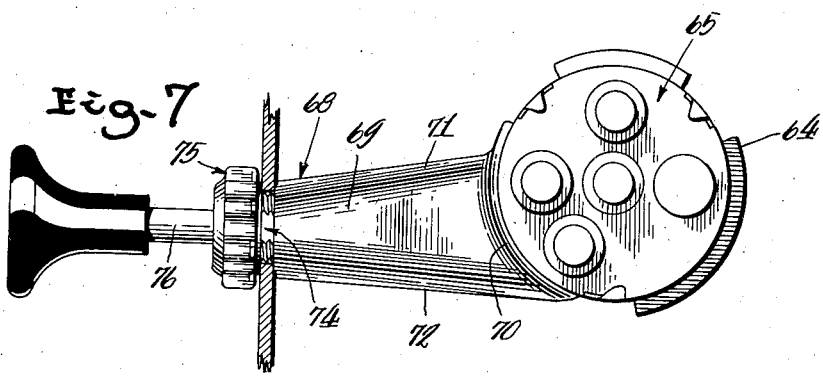
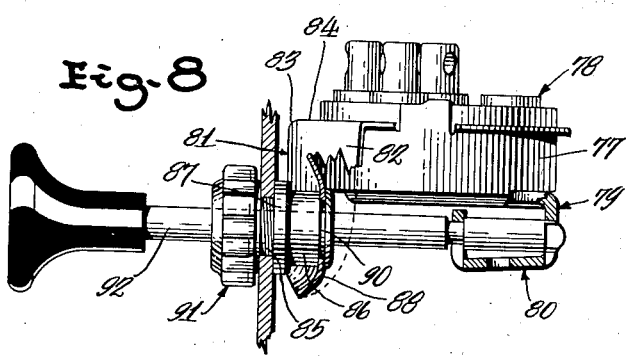
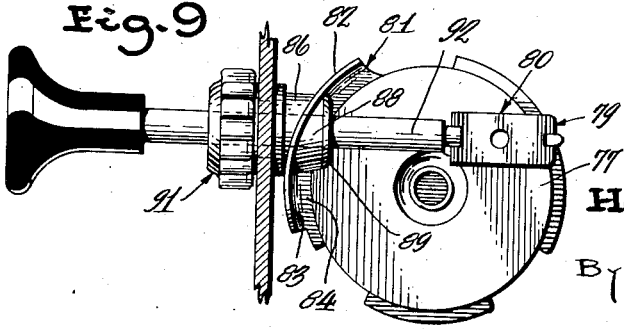
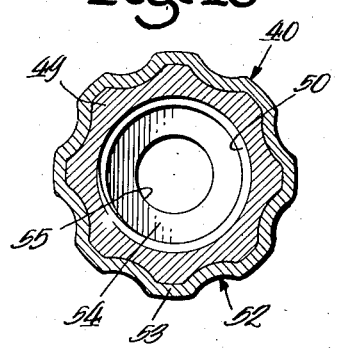
Harry A. Douglas
INVENTOR
By Freeman and Weidman
ATTORNEYS Patented Jan. 24, 1939

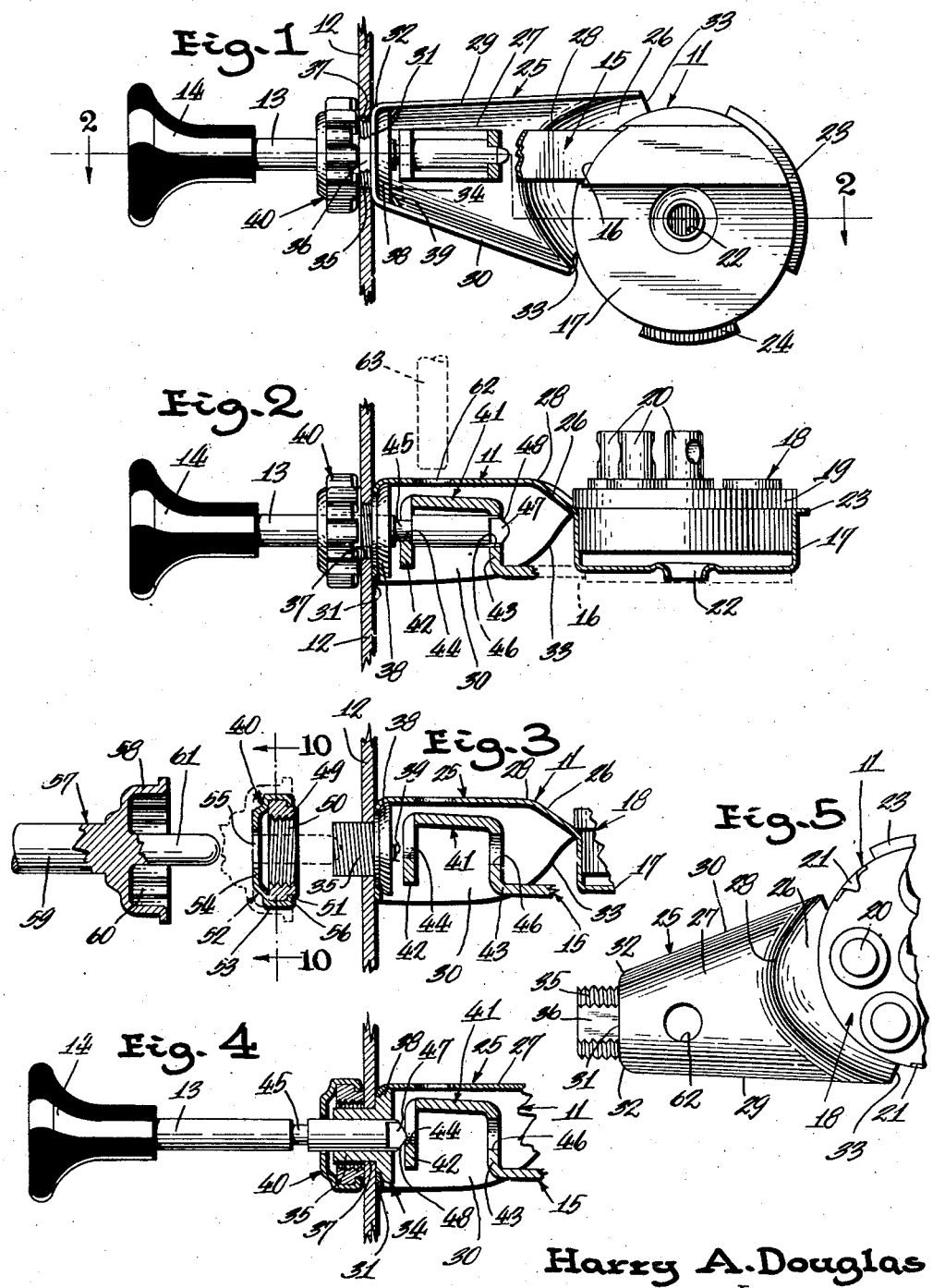

2,145,160

UNITED STATES PATENT OFFICE 2,145,160

CONTROL APPARATUS

Harry A. Douglas, Bronson, Mich., assignor to Kingston Products Corporation, a corporation of Indiana Application January 12, 1935, Serial No. 1,525

14 Claims. (Cl. 200—168)

My invention relates to control apparatus, and may be embodied in electric switches or other control apparatus. In its more specific aspects my invention relates to control apparatus, or operating means for control apparatus which is mountable on a panel. The principal object of my invention is to provide new and improved apparatus of these types. In the drawings accompanying this specification, and forming part of this application, I have shown for purposes of illustration, several forms which my invention may assume, and in these drawings:

Figure 1 is a side elevation of one embodiment of my invention with a part broken away for the sake of clearness, Figure 2 is a section taken on the line 2—2 of Figure 1, looking in the direction of the arrows, Figure 3 is a detail fragmentary view of some of the parts shown in Figures 1 and 2, disassembled, and ready to be assembled by a tool, Figure 4 is a fragmentary vertical sectional view of some of the parts shown in Figures 1 and 2 before they are completely assembled, Figure 5 is a fragmentary plan view of a detail, Figure 6 is a side elevation, partly in section, with a portion broken away, of a modification, Figure 7 is a plan view of the modification shown in Figure 6, Figure 8 is a side elevation, partly in section, with a portion broken away, of a further modification, Figure 9 is a bottom view of the modification shown in Figure 8, and Figure 10 is an enlarged sectional view, taken along the line 10—10 of Figure 3, looking in the direction of the arrows, of a detail.

Referring to Figure 1 of the drawings there is here shown a switch unit 11 mounted on a panel 12, the switch unit being provided with an actuator 13 extending through the panel. The actuator may be provided with a knob 14.

The switch unit is provided with operating means 15, in this case a longitudinally reciprocable bar extending into an aperture 16 in the side of and near the bottom of a casing 17. The casing 17 is here shown as generally cylindrical and of cup-shape, adapted to receive a switch 18 having a base 19. The base 19 may be provided with terminals 20 extending therethrough and electrically cooperable with movable switch elements (not shown). The switch 18 may be held in the casing 17 by providing the casing 17 with a plurality of tongues 21, at the upper edge of the casing, and clinching the tongues over the base 19, as may be seen in Figure 5. In this instance the bottom of the cup-shaped casing may be provided with an aperture 22, adapted to journal a rotatable portion of the switch mechanism. The casing may be provided at its upper edge with laterally extending flanges 23, 24. It is to be understood that the term upper and like terms are merely relative and not to be taken as limiting the parts to any particular position with respect to a horizontal plane.

The casing 17 may be supported from the panel 12 by means of a bracket 25, generally of channel-shaped cross-section, and having a general surface of skew form. The bracket 25 comprises a portion 26 of cone-like or conoidal form, the flaring portion of the conoidal surface merging into the cylindrical portion of the casing 17 at the upper edge of the latter. The bracket 25 further includes a generally conoidal portion 27, the flaring portion of which merges with the tapering portion of the conoidal portion 26, the junction of these merging portions forming a rounded crest 28, the locus of which is generally in the form of a conic section. The conoidal portions 26, 27 are reversely curved, the portion 26 being concave and the portion 27 being convex, viewing the outside of the channeled bracket, as in Figure 5. The bracket 25 is here shown as having plane sides 29, 30, merging into the conoidal portion of the bracket, and extending from the flaring ends of the conoidal portion 26 to and merging into a plane transverse end 31 forming a closure for the tapering end of the bracket 25. The plane end 31 is joined by a curved or fillet portion 32 to the plane sides 29, 30 and to the conoidal portion 27. The plane sides 29, 30 are here shown as being cut away at their ends nearest the casing 17 to form curved edges 33 which leads to the flaring ends of the conoidal portion 26.

Mounted at the end 31 of the bracket 25 is a threaded nipple 34 having an externally threaded portion 35. The portion 35 has diametrically opposite faces 36 cut away to form flat surfaces, and the panel 12 is provided with an aperture 37 of the same shape as the cross-section of the threaded portion 35 of the nipple, so that when the nipple is inserted through the aperture 37 the nipple will be prevented from turning in the aperture. The nipple is provided with a flange 38 seated against the inside surface of the end 31 of the bracket, the flange being provided with a rounded edge to conform to the inner surface of the rounded portion 32. The nipple 34 may be held in the bracket by striking in portions 39 of the plane sides 29, 30.

A threaded nut 40 is adapted to be screwed onto the threaded portion of the nipple 34 projecting through the panel 12.

The actuator 13, which is desirably a generally cylindrical rod, is adapted to pass through the nut 40, the bore in the nipple 34, and into the apertures in a U-shaped member 41 forming part of the operating means 15. As viewed in Figure 2 the portion 41 forms an inverted U, having legs 42, 43, disposed within the channel of the bracket 25. The leg 42 is provided with an aperture 44 large enough in width to pass the actuator 13. The aperture 44 may have its lower end, as viewed in Figure 2, rounded, to better engage the rounded surface of a reduced portion 45 of the actuator 13. To permit of relative lateral movement as between the actuator 13 and the leg 42, the aperture 44 is extended upwardly, as viewed in Figure 2. The end of the actuator 13 is provided with a reduced part 47, which is desirably non-circular in cross-section, formed by cutting away diametrically opposite portions. The reduced part 47 is adapted to fit an opening 46, of rectangular cross-section, in the leg 43. The reduced part 47 has its end desirably tapered so as to form a cam surface 48.

The nut 40 comprises a portion 49 of steel having a threaded bore 50. The face of the portion 49 directed toward the panel 12 has its outer periphery undercut at 51. The periphery of the portion 49 is desirably of corrugated form, as can be seen most clearly in Figure 10. The nut is provided with a sheath 52, desirably of some readily workable metal such as brass and which is also adapted to be suitably plated and finished. The sheath 52 is generally of cup-shape, the peripheral portion 53 being pressed or swedged on to the steel portion 49, to assume a corrugated outside surface corresponding to the corrugated surface of the steel portion 49. The end 54 of the sheath is spaced a desired distance from the opposed face of the portion 49. The end 54 of the sheath is desirably provided with an aperture 55, of less diameter than the threaded bore 50, for a purpose which will appear. The sheath may be provided with axially extending tongues 56 which are clinched over the crests of the corrugations on the portion 49 and into the undercut periphery 51 of the portion 49. The relative axial depth of the undercut portion 51 with respect to the thickness of the sheath 52 is such that the face of the nut adapted to be set up against the panel 12 projects axially beyond the clinched portions 56.

The nut 40 is particularly adapted for use with a socket wrench 57 having a socket member 58 provided in any suitable manner with an operating shank 59. The inside peripheral surface of the socket is provided with corrugations 60 complementary to the corrugations formed by the peripheral portion 53 of the nut. The wrench 57 is further desirably provided with a pin or projection 61, centrally located in the socket.

In order to screw the nut 40 onto the nipple 34, the pin 61 is inserted through the aperture 55 of the nut, to bring the corrugated inner periphery of the socket of the wrench into engagement with the corrugated outer periphery of the nut. The pin 61 then projects beyond the right hand face of the nut 40, as viewed in Figure 3. The fact that the pin 61 projects beyond that face of the nut enables the pin to enter the bore on the nipple 34 before the threaded bore 50 is started on the thread of the nipple. The shank 59 of the wrench is then turned in any suitable manner thereby screwing the nut 40 onto the nipple 34 and setting it up tight against the panel 12. During this operation the wrench is prevented from slipping off of the nut by the pin 61. The pin 61 also facilitates the threaded engagement of the nut 40 with the nipple.

The panel 12 is usually provided with a finish which would be marred, if the wrench were to slip off of the nut and come in contact with the panel, or if the nut were to slip off of the nipple in the threading operation and come into contact with the panel. Furthermore, while the face of the nut which is set up against the panel may mar the finish thereof, this marred portion cannot be seen by reason of the fact that the face of the nut engaging the panel does not extend to the outer periphery of the nut but only up to the undercut portion 51, and any marred portion is therefore covered by the portions of the nut 40 extending radially outwardly beyond the undercut face.

The fact that the end portion 54 of the sheath is spaced axially from the opposed face of the threaded portion 49 permits of considerable variation in the length of the threaded portion of the nipple which projects beyond the panel 12.

When the nut 40 has been tightened against the panel, the parts are ready to have the actuator 13 assembled therewith. In order to assemble the actuator with the operating means, it is only necessary to thrust the actuator through the opening 55 in the nut, the actuator first passing through the nipple 34 against the leg 42 of the U-shaped part 41, to the position shown in Figure 4. In that position the U-shaped member 41 is somewhat above its position shown in Figure 2, and therefore, the bottom of the aperture 44 is not in alignment with the lower edge of the actuator 13. Therefore the cam surface 48 at the end of the actuator is in contact with the margin of the bottom of the aperture 44, and consequently when the actuator 13 is moved to the right, as viewed in Figure 4, the U-shaped portion 41 will be moved downwardly, against the bias of the entire operating means 15, so that the actuator 13 can then pass through the aperture 44. Further motion of the actuator 13 to the right brings the reduced portion 47 to the aperture 46, and if the reduced portion 47 is brought into register with that aperture, it may be thrust into the aperture, bringing the shoulder of the reduced portion against the leg 43. At the same time the leg 42 is free to snap off of the larger section of the actuator 13 into the notch or reduced part 45. The parts are then in the position shown in Figures 1 and 2. The actuator is now securely latched to the operating means 15, and by pushing against the knob 14 the shoulder of the reduced portion 47 pushes against the leg 43 thereby moving the operating means 15 to the right as viewed in Figure 2. On the other hand, pulling on the knob 14 causes the shoulder of the notch 45 to pull against the right hand side of the leg 42 thereby moving the operating means 15 to the left.

Engagement of the reduced portion 47 with the aperture 46 prevents the actuator 13 from turning or tilting. It will be noted that the actuator cannot be brought into latched relation with the aperture 44 until the reduced portion 47 is fully inserted in the aperture 46.

The operating means 15 itself has sufficient resilience to act as means for biasing the latch formed by the leg 42 and the notch 45 into latched position.

Inasmuch as thrust and pull on the operating means 15 tends to bend the casing 17 with respect to the bracket 25, and with respect to the panel, it is important that the casing and bracket assembly be made rigid enough to resist these bending effects. At the same time heavy parts require more material, increase manufacturing difficulties, and are generally more expensive. The casing and bracket construction hereinbefore described requires only relatively thin sheet stock and yet is very rigid and strong.

It is also desirable to provide a rigid casing and bracket assembly so that the actuator 13 may be readily disconnected from the operating means 15 without distorting the parts. In order to disconnect the actuator 13 from the operating means 15, the parts are first brought to the position shown in Figure 2, by pulling the knob 14 out to its full extent, and then pressing downwardly against the upper part of the U-shaped member 41 so as to disengage the bottom of the aperture 44 from the notch 45, whereupon the actuator 13 may be freely removed from the rest of the apparatus. In the embodiment shown in Figures 1 through 5, pressure may be applied against the U-shaped member 41 by inserting through an opening 62 in the bracket 25 a suitable rod or pin 63. By pushing against the U-shaped member 41 the operating means 15 can be caused to spring sufficiently to release the latch, without bending the casing 17 or the bracket 25.

Figures 6 and 7 show a modified form of my invention in which a casing 64, corresponding to the casing 17 in Figure 1, is adapted to receive a switch 65, corresponding to the switch 18 of Figure 1. The switch 65 is provided with operating means 66, analogous to the operating means 15 of Figure 1, but in this case provided with a U-shaped portion 67, which is upright with respect to the switch casing 64, as compared to the inverted position of the U-shaped portion 41 with respect to the casing 17. It will be evident that the relative position of the U-shaped member 67 with respect to the casing 64 is such that the general plane of the casing 64 is above that of the U-shaped member 67, as viewed in Figure 6, and therefore the casing 64 is provided with a bracket 68 which in this instance slants downwardly from the casing 64 toward the general plane of the U-shaped member 67. The bracket 68 is generally of channel-shaped cross-section having a general surface of skew form. The trough portion of the channel forms a generally conoidal convex outer surface 69 which merges into the upper edge of the casing 64 through a fillet 70. The channel includes plane sides 71, 72 which extend from the junction between the flaring ends of the conoidal surface 69 with the casing 64 to an end portion 73 similar to the end portion 31 of Figure 1. The bracket 68 may be fastened to the panel 12 by a nipple 74 and nut 75, analogously to the manner already described in connection with Figure 1. The operating means 66 may be similarly actuated by means of an actuator 76.

Figures 8 and 9 show another modified form of my invention in which a casing 77 similar to the casing 17 of Figure 1, is adapted to receive a switch 78, similar to the switch 18. The switch 78 may be operated by means of operating means 79 similar to the operating means 15 of Figure 1, but in this instance the operating means includes a U-shaped member 80 not only inverted with respect to the U-shaped member 41, but disposed at the side of the casing 77 furthest away from the panel 12, instead of the side nearest the panel as in Figure 1. The casing 77 is provided with a bracket 81 which extends generally downwardly from the upper edge thereof and has a general surface of skew form. The bracket 81 includes a curved portion 82, in this instance forming a portion of a cylinder of larger diameter than that of the casing 77 and concentric therewith. The generally cylindrically curved portion 82 merges through a fillet 83, into a plane portion 84. The plane portion 84 extends laterally from the upper edge of the casing 77.

The bracket 81 may be mounted with the panel 12 by means of a threaded nipple 85 having a cylindrical head portion 86 provided with a collar 87 of larger diameter than the threaded portion. The threaded portion of the nipple passes through the panel 12 in a manner analogous to that described in connection with Figure 1. The head portion 86 of the nipple is adapted to be disposed within a generally conoidal portion 88 formed on the curved portion 82 of the bracket. The conoidal portion 88 forms an apertured boss directed generally inwardly toward the axis of the casing 77 but in such direction that the axis of the boss is in general alignment with the apertures in the U-shaped portion 80 of the operating means 79, when the apparatus is assembled as shown in Figures 8 and 9. The apertured end 89 of the boss is transverse to the axis of the boss. In order to fasten the nipple 85 to the curved part 82, the head portion 86 of the nipple may have an initially reduced end 90 extending through the aperture in the boss 88, the projecting part of the end 90 being enlarged by swedging it over the end 89 of the boss.

The bracket 81 may be held to the panel 12 by a nut 91 similar to the nut 40 of Figure 1, and an actuator 92 may be provided to cooperate with the U-shaped portion 80 in a manner analogous to that already described in connection with Figure 1.

It will be evident that the actuator 76 in the modification of Figures 6 and 7, and the actuator 92 in the modification of Figures 8 and 9 may be quickly detached from the associated operating means by pressing upwardly (as viewed in these figures) on the U-shaped members 67 and 80 respectively.

From the foregoing it will be apparent to those skilled in the art that my invention provides a new and improved control apparatus, readily and conveniently constructed and assembled, and accordingly, accomplishes at least the principal object of my invention. On the other hand, it also will be obvious to those skilled in the art that my invention may assume changed and modified embodiments other than those herein disclosed, without departing from the spirit of my invention, or sacrificing the advantages thereof. In general, the disclosure herein is illustrative only and my invention is not limited thereto.

I claim:

1. A housing and supporting means for apparatus mountable laterally of a support, comprising: a casing open on one side of said means for receiving the apparatus; a bracket for supporting said casing and having an opening adjacent the other side of said means for receiving means adapted to operate said apparatus; said casing and bracket being constructed integrally from a single piece of sheet metal stock.

2. A housing and supporting means for apparatus mountable laterally of a support, comprising: a casing for the apparatus; a bracket adapted to receive means for operating the apparatus, integrally joined to said casing, so constructed and arranged that it is mountable on the support and open along one side whereby access may be had to the operating means; said casing and said bracket being offset with respect to each other and constructed integrally, from a single sheet metal stamping flexible by flexing stresses of predetermined amount, to form a rigid unit so constructed and arranged, by bending of said sheet metal to form said joined casing and bracket, that said unit is rigid against stresses of said amount tending to rotate said casing bodily with respect to said bracket.

3. A housing and supporting means for apparatus mountable laterally of a support, comprising: a casing for the apparatus; a bracket, integrally joined to said casing, for supporting said casing; said bracket being so constructed and arranged that it is mountable on the support; said casing and said bracket being so constructed integrally from a single sheet metal stamping that said bracket has a cross-sectional outline of concavo-convex form and said casing and said bracket form a rigid unit.

4. A housing and supporting means for apparatus mountable laterally of a support, comprising: a casing, for the apparatus, having side walls and an end wall, and an open end, opposite said end wall, for the reception of the apparatus; and a bracket, integrally joined to said casing, for supporting said casing; said bracket having a cross-sectional outline of concavo-convex form, the concave side of said bracket facing in a direction different from that of said open end of said casing; said casing and said bracket being constructed integrally from a single sheet metal stamping.

5. A housing and supporting means for switch apparatus mountable laterally of a support, comprising: a casing for the apparatus; a bracket, integrally joined to said casing, for supporting said casing; said bracket being so constructed and arranged that it is mountable on the support by means extending through the bracket; said casing and said bracket being so constructed integrally from a single sheet metal stamping that said bracket has a portion with a conoidal surface merging into the surface of said casing and said casing and said bracket form a rigid unit with the bracket being open along one side whereby to receive and permit access to means for operating the switch apparatus.

6. A housing and supporting means for switch apparatus mountable laterally of a support, comprising: a casing open on one side of said means for receiving the apparatus, said casing having an aperture; a bracket, integrally joined to said casing, for supporting said casing and having an elongated opening adjacent the other side of said means whereby access may be had to means adapted to be disposed in said bracket for operating said switch apparatus; said bracket being so constructed and arranged that it is mountable on the support; said bracket having an aperture; said apertures in said casing and in said bracket having their axes offset from each other and approximately parallel; said casing and said bracket being constructed integrally from a single sheet metal stamping to form a rigid unit.

7. A housing and supporting means for apparatus mountable laterally of a support, comprising: a casing, for the apparatus, having side walls and an end wall, and an open end, opposite said end wall, for the reception of the apparatus; said casing having an aperture in a side wall thereof; a bracket, integrally joined to said casing, for supporting said casing; said bracket having a cross-sectional outline of concavo-convex form, the concave side of said bracket facing in a direction different from that of said open end of said casing, and being so constructed and arranged that it is mountable on the support; said bracket having an aperture; said apertures in said casing and in said bracket having their axes offset from each other and approximately parallel; said casing and said bracket being constructed integrally from a single sheet metal stamping.

8. A housing and supporting means for apparatus mountable laterally of a support, comprising: a casing, for the apparatus, having a cylindrical side wall and an end wall, and an open end, opposite said end wall, for the reception of the apparatus; a bracket, integrally joined to said casing at said open end of said cylindrical wall, so constructed and arranged that it is mountable on the support; said bracket having a cross-sectional outline of concavo-convex form, the concave side of said bracket facing in a direction different from the direction of the axis of said cylindrical wall; said casing and said bracket being constructed integrally, from a single sheet metal stamping flexible by flexing stresses of predetermined amount, to form a rigid unit so constructed and arranged, by bending of said sheet metal to form said joined casing and bracket, that said unit is rigid against stresses of said amount tending to rotate said casing bodily with respect to said bracket.

9. An electric switch, comprising: switch mechanism; a casing open on one side to receive said switch mechanism; a bracket, integrally joined to said casing, so constructed and arranged that it is mountable on a support and having an opening facing in a direction opposite to the open side of the casing to receive means adapted to operate said switch mechanism; reciprocating means, for operating said switch mechanism, so constructed and arranged that operation thereof produces stresses tending to rotate said casing bodily with respect to the support; said casing and bracket being constructed integrally from a single sheet metal stamping, to form a rigid unit so constructed and arranged, by bending of said sheet metal to form said joined casing and bracket, that said unit is rigid against such stresses.

10. An electric switch, comprising: switch mechanism; a casing open on one side to receive said switch mechanism, said casing having an aperture; a bracket, integrally joined to said casing, for supporting said casing and having an opening facing in a direction opposite to the open side of the casing whereby to receive means adapted to operate said switch mechanism; said bracket being so constructed and arranged that it is mountable on the support; said bracket having an aperture; said apertures in said casing and in said bracket having their axes offset from each other and approximately parallel; said casing and said bracket being constructed integrally from a single sheet metal stamping; and switch operating mechanism extending through said apertures.

11. An electric switch, comprising: switch mechanism; a casing, for said switch mechanism, having side walls and an end wall, and an open end, opposite said end wall, for the reception of said switch mechanism; said casing having an aperture in a side wall thereof; a bracket, integrally joined to said casing, for supporting said casing; said bracket having a cross-sectional outline of concavo-convex form, the concave side of said bracket facing in a direction different from that of said open end of said casing, and said bracket being so constructed and arranged that it is mountable on a support; said bracket having an aperture; said apertures in said casing and in said bracket having their axes offset from each other and approximately parallel; means, for operating said switch mechanism, extending through said apertures and so constructed and arranged that operation thereof produces stresses tending to rotate said casing bodily with respect to the support; said casing and said bracket being constructed integrally from a single sheet metal stamping, to form a rigid unit so constructed and arranged, by bending of said sheet metal to form said joined casing and bracket, that said unit is rigid against such stresses.

12. An electric switch, comprising: switch mechanism; a casing, for said switch mechanism, having a cylindrical side wall and an end wall, and an open end, opposite said end wall, for the reception of said switch mechanism; a bracket, integrally joined to said casing at said open end of said cylindrical wall, so constructed and arranged that it is mountable on a support; said bracket having a cross-sectional outline of concavo-convex form, the concave side of said bracket facing in a direction different from the direction of the axis of said cylindrical wall; means for operating said switch mechanism, so constructed and arranged that operation thereof produces stresses tending to rotate said casing bodily with respect to the support; said casing and said bracket being constructed integrally, from a single sheet metal stamping, to form a rigid unit so constructed and arranged, by bending of said sheet metal to form said joined casing and bracket, that said unit is rigid against such stresses.

13. An electric switch, comprising: switch mechanism; a casing, for said switch mechanism, having a cylindrical side wall and an end wall, and an open end, opposite said end wall, for the reception of said switch mechanism; said casing having an aperture in said cylindrical wall; a bracket, integrally joined to said casing at said open end of said cylindrical wall, constructed and arranged to support said casing; said bracket having a cross-sectional outline of concavo-convex form, the concave side of said bracket facing in a direction different from the direction of the axis of said cylindrical wall, and said bracket being so constructed and arranged that it is mountable on the support; said bracket having an aperture; said apertures in said casing and in said bracket having their axes offset from each other and approximately parallel; means, for operating said switch mechanism, extending through said apertures and so constructed and arranged that operation thereof produces stresses tending to rotate said casing bodily with respect to the support; said casing and said bracket being constructed integrally from a single sheet metal stamping, to form a rigid unit so constructed and arranged, by bending of said sheet metal to form said joined casing and bracket, that said unit is rigid against such stresses.

14. A cup shaped housing having an open side adapted to receive switching apparatus, an elongated channel shaped bracket having an open side facing in a direction opposite to that of the open side of said housing, and adapted to receive means for operating the switching apparatus, and said housing and bracket being constructed of sheet metal stock, and integrally connected together by a conoidal portion of the said metal merging with the housing and bracket.

HARRY A. DOUGLAS.